(12) United States Patent
Corey

(10) Patent No.: US 6,841,900 B2
(45) Date of Patent: Jan. 11, 2005

(54) RECIPROCATING DEVICE AND LINEAR SUSPENSION

(75) Inventor: John A. Corey, Melrose, NY (US)

(73) Assignee: Clever Fellows Innovation Consortium, Troy, NY (US)

( * ) Notice: Subject to any disclaimer, the term of this patent is extended or adjusted under 35 U.S.C. 154(b) by 0 days.

(21) Appl. No.: 10/253,797

(22) Filed: Sep. 24, 2002

(65) Prior Publication Data

US 2003/0015922 A1 Jan. 23, 2003

Related U.S. Application Data

(63) Continuation-in-part of application No. 09/591,480, filed on Jun. 9, 2000, now Pat. No. 6,492,748.
(60) Provisional application No. 60/324,843, filed on Sep. 25, 2001.

(51) Int. Cl.[7] ............... F16F 1/22; F16F 1/26; H02K 7/08
(52) U.S. Cl. ............ 310/17; 310/12; 267/71; 60/520
(58) Field of Search .............. 310/13, 15, 17, 310/20; 267/160, 161, 171; 60/520; 335/262, 270, 274, 277

(56) References Cited

U.S. PATENT DOCUMENTS

| | | | |
|---|---|---|---|
| 4,238,845 A | | 12/1980 | Haggard et al. ............ 367/183 |
| 4,290,040 A | * | 9/1981 | Feightner et al. ........... 335/274 |
| 4,349,757 A | | 9/1982 | Bhate ........................ 310/15 X |
| 4,602,174 A | | 7/1986 | Redlich ........................ 310/15 |
| 5,099,182 A | * | 3/1992 | Isaacson et al. ............ 318/254 |
| 5,139,242 A | | 8/1992 | Yarr ............................ 267/160 |
| 5,146,123 A | | 9/1992 | Yarr ............................. 310/15 |
| 5,389,844 A | | 2/1995 | Yarr et al. .................... 310/15 |
| 5,522,214 A | | 6/1996 | Beckett et al. ................ 60/517 |
| 5,973,422 A | * | 10/1999 | Clamme ...................... 310/36 |
| 6,050,556 A | | 4/2000 | Masuda et al. ............. 267/161 |
| 6,188,149 B1 | * | 2/2001 | De Jager et al. ............. 310/12 |
| 6,377,145 B1 | * | 4/2002 | Kumagai .................... 335/274 |

FOREIGN PATENT DOCUMENTS

DE  3621133 A1 * 1/1988 .................. 310/15

OTHER PUBLICATIONS

Translation of German patent document DE 36 21 133 A1, published Jan. 7, 1988, Wolfgang Scharmer.*

* cited by examiner

Primary Examiner—Thanh Lam
Assistant Examiner—Judson H. Jones
(74) Attorney, Agent, or Firm—Spencer K. Warnick; Hoffman, Warnick & D'Alessandro LLC

(57) ABSTRACT

In a reciprocating device having a moving element, a stator and a flexing suspension for coupling the moving element and stator and for maintaining the moving element on axis, the flexing suspension comprising: at least one flexing element locating the stator relative to the moving element by directly engaging features of the flexing element to mating features of the stator.

30 Claims, 15 Drawing Sheets

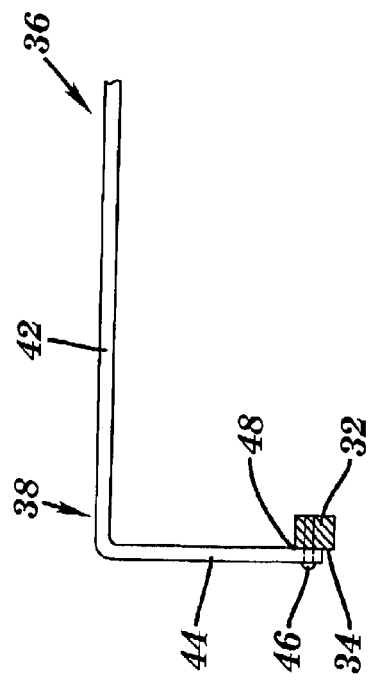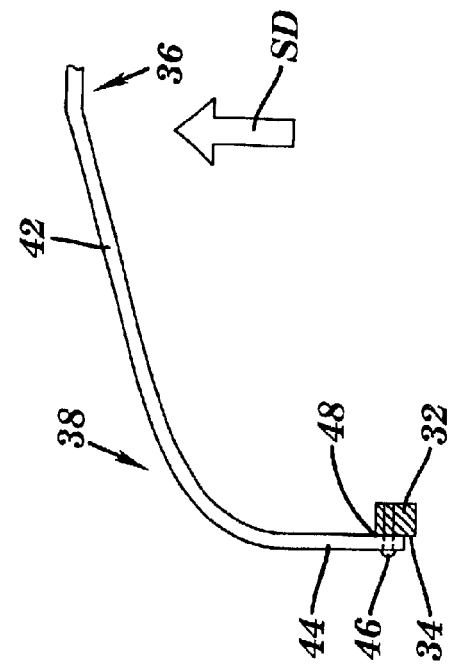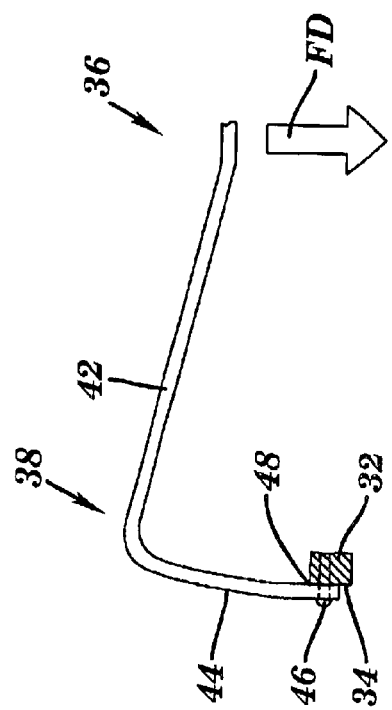

RECIPROCATING DEVICE AND LINEAR SUSPENSION

REFERENCE TO PRIOR APPLICATIONS

This application is a continuation-in-part application of U.S. Ser. No. 09/591,480, filed Jun. 9, 2000 now U.S. Pat. No. 6,492,748, and claims priority to provisional application Ser. No. 60/324,843, filed on Sep. 25, 2001 and incorporated herein by reference.

BACKGROUND OF THE INVENTION

1. Technical Field

The present invention relates generally to a reciprocating device and linear suspension and, more particularly, to a reciprocating device and linear suspension element for eliminating costly precision fasteners and corresponding precision holes when attaching a reciprocating device moving element and linear drive mechanism.

2. Related Art

There are a variety of linear suspensions available to constrain movement of a moving element in a linear motor or reciprocator. These suspensions are analogous to bearings in rotary devices because they restrict a moving element to primarily move in the operationally useful sense and prevent motion in other directions. Additional objectives of a linear suspension (as opposed to linear bearings) are to provide long-life reciprocation with no friction or wear and to eliminate wear at start-up and shut-down or low-stroke operations when normal bearings develop insufficient velocity or pressure to function.

U.S. Pat. No. 5,552,214 to Beckett et al. discloses an exemplary spiral suspension (sometimes referred to as an "Oxford" spring) for a reciprocator. This suspension spirally expands to allow its center to move perpendicularly to the spiral plane. It resists radial movement to limit linear motion of a moving element to a single axis perpendicular to the spiral plane.

A problem with spiral suspensions is their inducement of a torsional motion about the reciprocation axis. See U.S. Pat. No. 5,522,214 to Stirling Technology Corporation. This motion may cause vibration and failure and requires the moving element to be circular in section, or have excessive clearances to the stationary elements of an assembly in order not to collide with the stationary elements during operation. Accordingly, spiral suspensions are useless with reciprocators as disclosed in U.S. Pat. No. 5,389,844 to Yarr et al. (commonly called "STAR" reciprocators) in which the moving element and stationary elements mate in a generally non-circular manner. In these reciprocators, the suspension must exhibit substantial torsional stiffness as well as radial stiffness to prevent running contact between reciprocating/moving and stationary elements.

Strap suspensions, such as described incidentally in U.S. Pat. No. 5,389,844 to Yarr et al., have been developed for "STAR" reciprocators. In these suspensions, radial straps are provided and anchored at at least two points at each end to resist torsional movement and radial movement of the moving element. Tensile stresses experienced by the radial portions of the legs of the flexure element strap are transferred to bending stresses in the vertically mounted ends of the legs (oriented approximately 90 degrees to the radial portions). A potential problem with these suspensions, however, is that fretting may occur on the ends of the flexure elements where they are clamped, especially at large strokes and strap strains. Furthermore, the clamping of the legs to the mount may be mechanically cumbersome.

To utilize the torsional stiffness within a suspension, the mechanical connection of the suspension to the moving element and stator must also be resistant to torsional loads. Further, if the moving element-stator interface has been designed in a non-circular form, then there exists a preferred, or required, precise relative angular positioning between the moving element and stator where sufficient interface clearance exists to allow non-contacting movement of the moving element adjacent to the stator. To ensure such angular positioning, others have used precision pins or shouldered threaded fasteners to attach the suspension elements to the moving element and/or stator, thereby aligning them together in both centric and angular position. Such alignment features are expensive to add as they require high precision in both hole-making and in fastener dimensions, as well as precision in location of the aligning features with respect to the features to be aligned (e.g., magnets, stator pole faces, etc.).

Even designs that are circular in section at the interface between moving element and stator use and benefit from precision location features between these parts. Although rotation and angular position will not directly lead to contact between moving element and stator in these devices, eccentricity will, forcing at least one alignment feature to ensure concentricity. Further, the attachment of the suspension must not allow local relative motion between the suspension and its mounts, or fretting damage to that interface can occur, leading to premature failure of the suspension. This is especially true in the commonly-used spiral-planar suspensions because the operation of the springs necessarily imparts a jerky torque between stator and moving element by the twisting (and untwisting) required in this kind of suspension to accommodate reciprocation. This is true even when the mountings are improved as shown, for instance, in U.S. Pat. No. 6,050,556 to Masuda et al. Additional complexity is created where multiple suspension elements are fitted in parallel, and it becomes necessary to align the elements in both centric and angular manners. In devices like those of Redlich, U.S. Pat. No. 4,602,174, or Bhate, U.S. Pat. No. 4,349,757, the radial laminations of the stator make this an awkward and expensive mounting, as axial holes can only be provided in auxiliary rings separately attached to the radial laminates.

In view of the foregoing there is a need in the art for a suspension element capable of withstanding operational and non-axial stresses and providing longer life. In addition, there is a need in the art for a suspension element that allows for precise and inexpensive alignment of parts. Further, there is a need for a reciprocating device and suspension having the same characteristics.

SUMMARY OF THE INVENTION

The invention provides an improved linear suspension element and a reciprocator using the linear suspension element. In a preferred embodiment, the suspension element includes preloaded legs connecting a moving element to a static element of the reciprocator. The preloads substantially reduce fretting, simplify the mechanical coupling structure, provide longer life and maximize stroke within allowable stress limits. In another preferred embodiment, the suspension element provides a mechanism for aligning parts by providing a portion for directly engaging a part of the drive mechanism, e.g., the stator, to establish relative alignment.

A first aspect of the invention is directed to a reciprocating device having a moving element, a stator and a flexing suspension for coupling the moving element and stator and for maintaining the moving element on axis, the flexing suspension comprising: at least one flexing element locating the stator relative to the moving element by directly engaging features of the flexing element to mating features of the stator.

A second aspect of the invention is directed to a linear suspension element for a reciprocating device having a moving element and a linear drive mechanism, the suspension element comprising: a mount; and a plurality of legs each having a first portion for coupling to the moving element, a second portion coupled to the mount and a third portion engaging the linear drive mechanism.

A third aspect provides a reciprocating device comprising: a linear drive mechanism for linearly moving a moving element; at least one suspension element operatively coupled to the linear drive mechanism, each suspension element having: a mount; a plurality of legs each having a first portion for coupling to the moving element, a second portion coupled to the mount, and a third portion engaging the linear drive mechanism; and wherein each leg includes a preload.

A fourth aspect of the invention is directed to a linear suspension for a moving element of a reciprocating device having a linear drive mechanism for the moving element, the suspension comprising: a first mount coupled to a stator of the linear drive mechanism; a plurality of legs each having a first portion coupled to the moving element, a second portion coupled to the first mount, and a third portion coupled to the stator, a second mount coupled to the linear drive mechanism; and a plurality of legs each having a first portion coupled to the moving element, and a second portion coupled to the second mount, and a third portion coupled to the stator.

A fifth aspect of the invention is directed to a reciprocating device comprising: a moving element including a locating feature; a linear drive mechanism for linearly moving the moving element; a suspension element having: a hub including a mating feature for mating with the locating feature of the moving element; a plurality of legs; and at least one engaging feature for engaging the linear drive mechanism.

The foregoing and other features and advantages of the invention will be apparent from the following more particular description of preferred embodiments of the invention.

BRIEF DESCRIPTION OF THE DRAWINGS

The preferred embodiments of this invention will be described in detail, with reference to the following figures, wherein like designations denote like elements, and wherein:

FIGS. 4A–4C show details of flexing movement of one leg of the linear suspension element of FIG. 2;

DESCRIPTION OF THE PREFERRED EMBODIMENTS

First Embodiment

Figure 1:
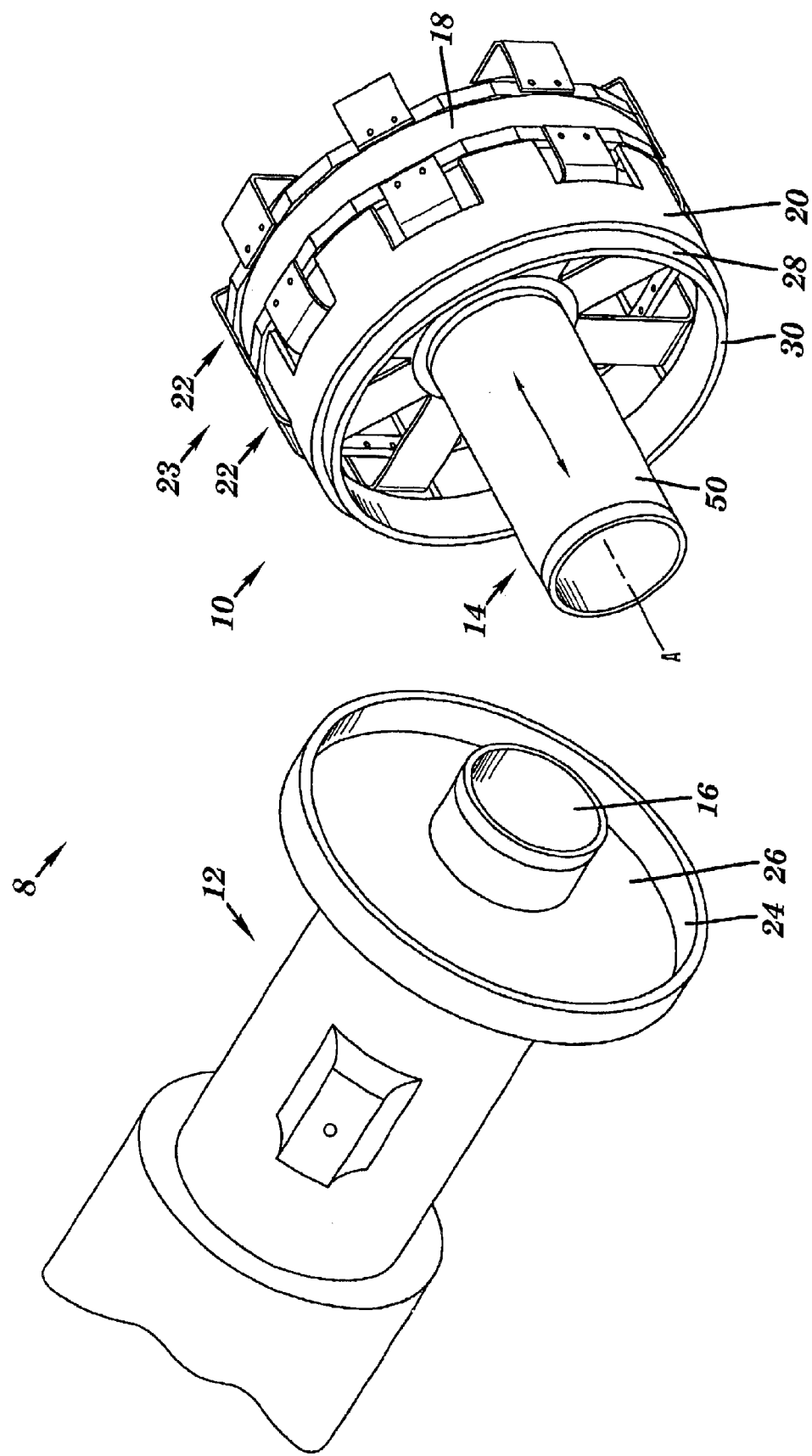
FIG. 1 shows a reciprocator assembly in accordance with the invention.

Referring to FIG. 1, a reciprocator assembly 8 is shown that includes a reicprocator 10 and a mating cylinder assembly 12. In operation, reciprocator 10 and cylinder assembly 12 are assembled such that a moving element 14 of reciprocator 10 is linearly movable along an axis A of reciprocator 10 and in a close-clearance relation in a cylinder bore 16 of cylinder assembly 12. Reciprocator 10 includes moving element 14 and a linear drive mechanism or motor 18, similar to that disclosed in U.S. Pat. Nos. 5,389,844 and 5,139,242, which are hereby incorporated by reference. Reciprocator 10 may also include a reciprocator casing 20, sometimes called a crown ring. Linear drive mechanism 18 includes, as will be recognize by one with skill in the art, a plunger and stator and has at least one, and preferably two, linear suspension elements 22 that form a linear suspension 23 coupled thereto. Linear suspension 23 allows reciprocation and substantially restricts non-axial motion, e.g., torsional, rotational and/or radial motion, of moving element 14 relative to reciprocator 10, i.e., it restricts any motion except that along reciprocation axis A. Moving element 14 is sometimes referred to as a piston because it is the power-transmitting element of reciprocator 10.

Cylinder assembly 12 is the interface between reciprocator 10 and a wide range of machines recognizable to one having ordinary skill in the art. A few examples of machines are: free-piston Stirling engines, thermoacoustic engine-generators, free-piston cryocoolers, gas-cycle refrigeration machines, pulse tube drivers, and gas compressors. In the example shown, the cylinder assembly 12 is for a twin motor pulse tube driver in which a reciprocator 10 is coupled to each end of cylinder assembly 12 (only one is shown for simplicity).

In any setting, cylinder assembly 12 preferably includes a number of structures for interfacing with reciprocator 10 including: cylinder bore 16, a pilot bore 24 and a cylinder face 26. Reciprocator 10, or reciprocator casing 20, includes a pilot 28 that mates with pilot bore 24 and an end or pilot face 30 that mates face-to-face with cylinder face 26. The details of assembly will be discussed in more detail relative to FIGS. 7–10.

Linear suspension element 22 limits motion of moving element 14 along a reciprocation axis A during operation of reciprocator 10. Referring to FIGS. 2–5, linear suspension element 22 includes a suspension mount 32, preferably in the form of a sing having sides 34 as shown best in FIG. 6. Linear suspension element 22 also includes a suspension strap assembly 36, to be described in more detail below. Mount 32 also includes mounting holes 33. It should be recognized that mount 32 may take a variety of forms other than the multi-sided ring configuration and not depart from the teachings of the invention.

Suspension strap assembly 36 includes a number of legs, or flexure elements, 38 extending substantially radially from a hub 40. Legs 38 are preferably made from fatigue-resistant, high strength tempered steel, such as AISI 1095, SS316 or, preferably, UHB 716 from Uddeholm Corp. Each leg 38 is formed to have a first substantially radial portion 42 and a second substantially axial portion 44. Axial portion 44 is typically shorter than radial portion 42 for reasons that will become more apparent below. Each axial portion 44 is coupled to mount 32 by at least one, and preferably two, rivet(s) 46. If only one rivet 46 is used, other restraints may be required to prevent leg rotation about the single rivet.

Each axial portion 44 is provided to dissipate the tensile forces applied to their respective radial portion 42 applied during reciprocation of moving element 14. In particular, an axial portion 44 acts to transform tensile stress in a respective radial portion 42 to bending stress in that axial portion 44. The optimal length of portions 42, 44 is determined by many factors such as the amount of stress allowed for a desired stroke of suspension element 22, the width and thickness of legs 38, etc. Such detailed dimensions are best determined by finite element stress analysis of proposed designs.

To form reciprocator 10, hub 40 is coupled to a hub mounting 60 (shown in FIG. 7) that is coupled to moving element 14 in a known fashion. Mount(s) 32 is coupled to linear drive mechanism 18, or other immovable structure of reciprocator 10, in a known fashion, e.g., by bolts through mounting holes 33. In the reciprocator shown in FIG. 1, two linear suspension elements 22, one on each side of linear drive mechanism 18, are required to form linear suspension 23 and to guide moving element 14 along reciprocation axis A. Reciprocator casing 20 may be machined to accommodate one suspension element 22 inboard.

Figure 3:
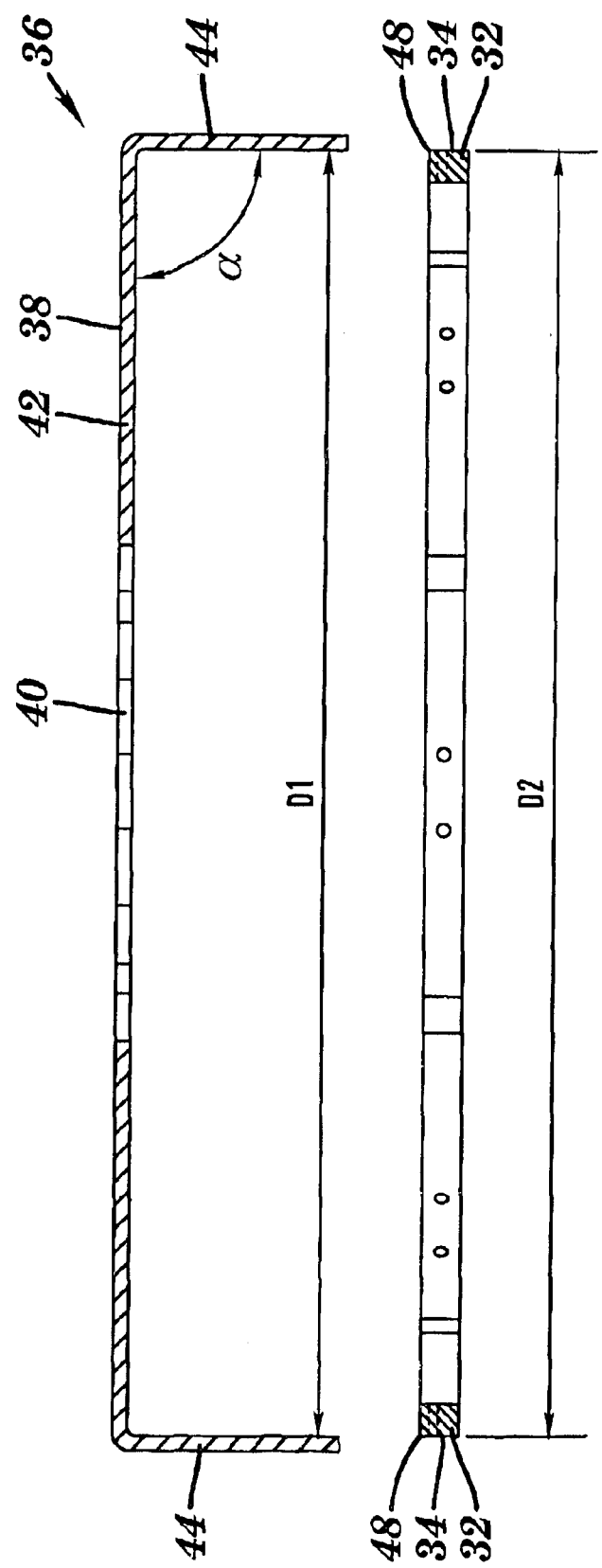
FIG. 3 shows a cross-sectional view along line 3—3 of FIG. 2 with the components disassembled.

Referring to FIGS. 3 and 4A–4C, linear suspension element 22 is shown disassembled. In FIG. 4A, strap assembly 36 is shown at a rest position, i.e., reciprocator 10 is not in operation, and assembly 36 is substantially midway between its allowable extreme positions shown in FIGS. 4B and 4C. As shown in FIG. 3, radial portion 42 of each leg 38 is preferably formed at an angle α of approximately 90° relative to axial portion 44 of the same leg 38. In a preferred embodiment, linear suspension element 22 may include a fist preload to prevent separation of an axial portion 44 and mount 32 at a fulcrum edge 48 of mount 32. Separation would otherwise occur when legs 38 distort during reciprocator 10 operation. This first preload is provided, as shown in FIG. 3, by having an inner distance D1 between any two opposing axial portions 44 less than an outer distance D2 between any two opposing sides 34 of mount 32 to which axial portions 44 are coupled. This set up can be provided by forming inner distance D1 on suspension strap assembly 36 between any two opposing axial portions 44 less than an outer distance D2 between any two opposing sides 34 of mount 32. In one preferred embodiment, inner distance D1 is set about 1% less than outer diameter D2. Alternatively stated, mount 32 may be formed such that opposing sides 34 are wider than inner distance D1. Once suspension strap assembly 36 is assembled, each axial portion 44 thus includes a preload bend over fulcrum edge 48 of mount 32. It should be recognized that while suspension strap assembly 36 is shown with an even number of legs 38, and mount 32 with an even number of sides 34, that an odd number of legs 38 and sides 34 may also be provided. In this case, the average inner diameter of strap assembly 36 may be configured to be less than an average outer diameter of mount 32 to form the desired preload.

The first preload provides a number of advantages. First, regardless of the direction of movement of suspension element 22, contact between element 22 and mount 32 is preserved, avoiding fretting of either component as might occur if repeated motion cycles caused repeated separations and re-contacting at that interface. To further explain, moving element 14 and suspension element 22 move between two extreme positions, which are shown relative to suspension element 22 in FIGS. 4B and 4C. FIG. 4B shows a leg 38 of suspension element 22 in a first extreme position in which moving element 14 has moved in a first direction, indicated by arrow FD, through mount 32. Because of the first preload, legs 38 and, in particular, axial portion 44 deform such that they do not pull away from fulcrum edge 48 of mount 32 at any time. As a result, fretting on second portion 44 is avoided. Similarly, FIG. 4C shows a leg 38 of suspension element 22 in a second extreme position in which moving element 14 has moved in a second direction, indicated by arrow SD, opposite first direction FD and away from mount 32. In this position, legs 38 and, in particular, axial portion 44 intrinsically deform such that they do not pull away from fulcrum edge 48 of mount 32. Maintaining contact of axial portions 44 and mount 32, at or near fulcrum edges 48, at all times during operation avoids wear or fretting of either axial portion 44 or mount 32 that would otherwise be caused by their relative movement. Accordingly, suspension element 22 lasts longer.

A second advantage of the first preload is that the need for a complex clamping mechanism for axial portions 44, such as that disclosed in U.S. Pat. No. 5,389,844, is removed. For instance, normally in the extreme position shown in FIG. 4B, axial portion 44 would be forced away from fulcrum edge 48 and would require some mechanism to restrain it from doing so, e.g., clamping blocks as shown in U.S. Pat. No. 5,389,844. However, because of the presence of the first preload, no clamping mechanism is required.

Figure 5:
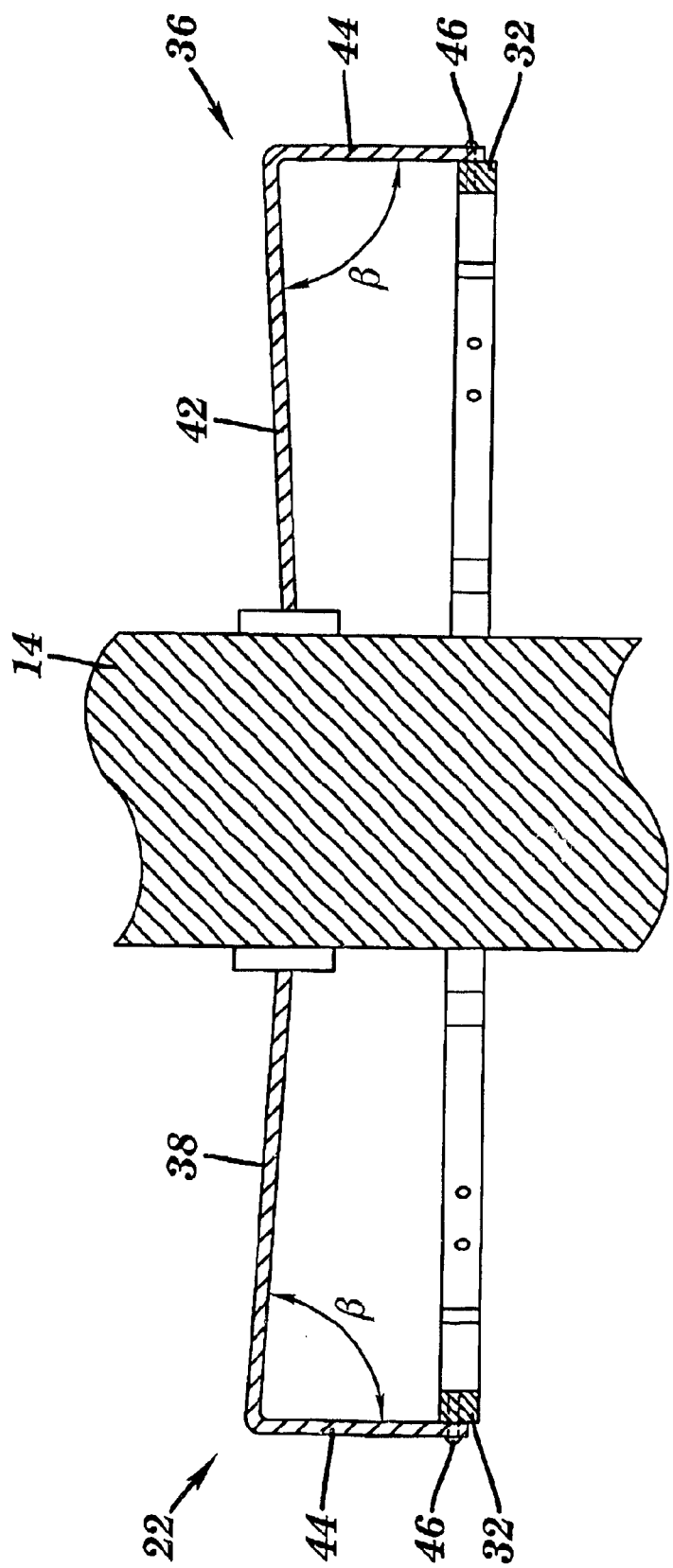
FIG. 5 shows a cross-sectional view of a detail of a mounted linear suspension element of FIG. 2.
Figure 6:
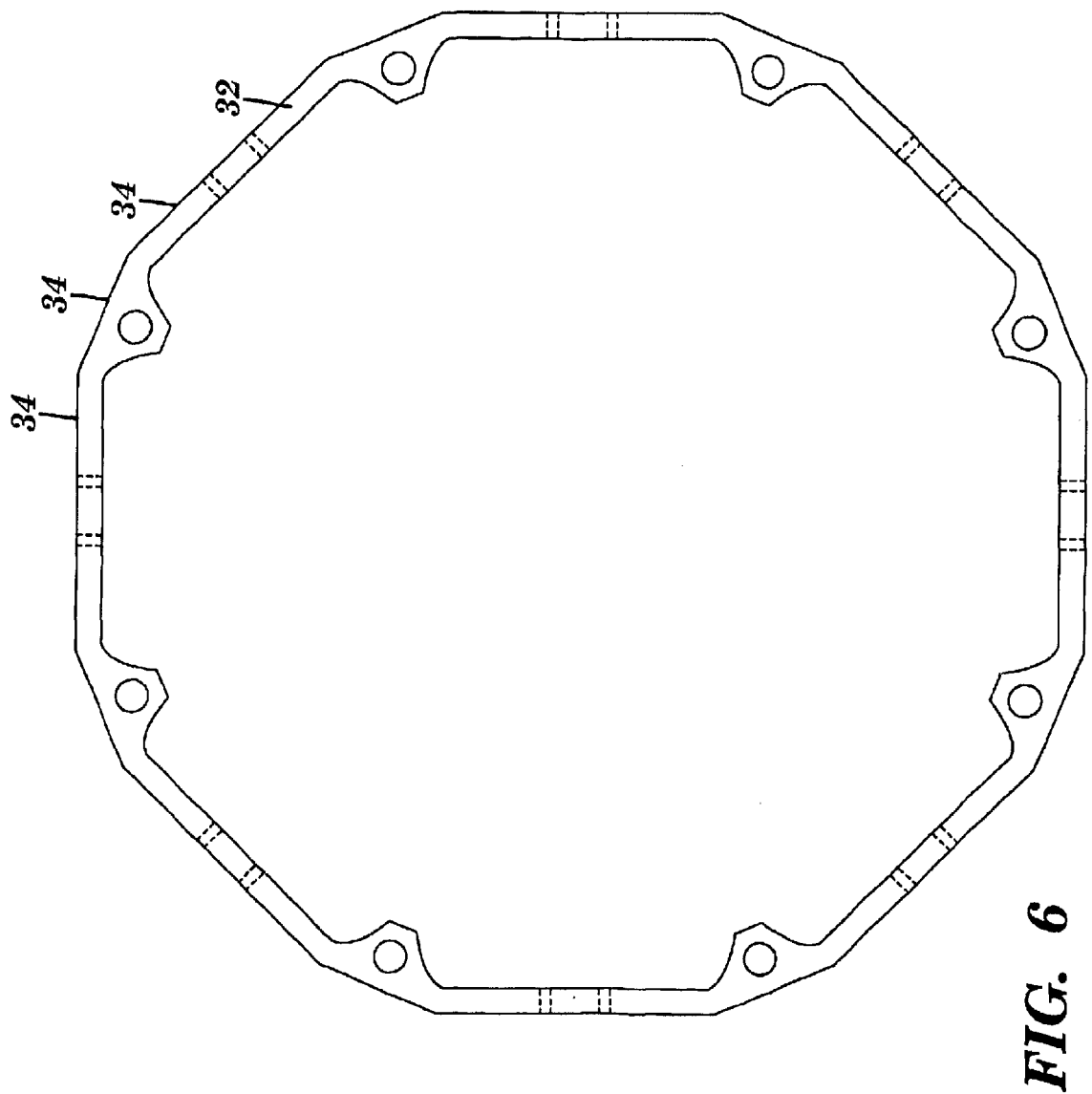
FIG. 6 shows a detail of a mount of the linear suspension element of FIG. 2.

Returning to FIGS. 4B–4C, extension of legs 38 caused by movement in second direction SD (FIG. 4C) raises stress more rapidly than compression by movement in first direction FD (FIG. 4B). If a suspension reciprocates by equal amounts in both first direction FD and second directions SD relative to a relaxed position, the total stroke range will be limited by stress levels induced during movement in second direction SD, although further movement without overstress would be possible in first direction FD if not accompanied by further movement in second direction SD. Total allowable stroke range could be increased if such an unequal range of motion in first direction FD and second direction SD, respectively, could be employed. To address this situation, as shown in FIG. 5, linear suspension element 22 may also include a second preload. The second preload is preferably created by coupling suspension strap assembly 36 to moving element 14 with a slight elastic bend towards mount 32, i.e., such that axial portion 44 and radial portion 42 are set at an angle β less than angle of forming α. Angle β is preferably less than 90°. This second preload provides a more balanced stress range in legs 38 during reciprocation. Accordingly, when moving element 14 moves in second direction SD, more extension relative to the installed preload position can be accommodated before exceeding the fatigue stress limits of the suspension material. As a result, suspension element 22 can operate with a greater total stroke range than if motion in second direction SD were centered about a non-preloaded position. It should be recognized that where two linear suspensions 22 are used, both can include a second-type preload. In this instance, a moving element 14 may be used that is positioned, or includes coupling structure, that draws together opposing hubs 40 of strap assemblies 36 simultaneously providing second-type preload to both suspensions 22 without offsetting the rest position of moving element 14 with respect to linear drive mechanism 18.

The first and second preloads may be provided together or individually. Furthermore, it should be recognized that other mechanisms of establishing the preloads may also be provided and not depart from the present invention.

An advantage of a linear suspension element such as that described above (or a suspension that includes one) is the substantial prevention of non-axial motion it provides. Such resistance to non-axial motion is especially beneficial regarding improved methods of constructing a reciprocator 10 and moving element 14, and improved methods of producing non-contacting alignment of relative moving elements, in accordance with a second preferred embodiment of the invention. The improved methods are made possible, in part, by the torsionally and radially stiff linear suspension described in U.S. Pat. No. 5,389,844, and/or by the refined linear suspension element 22 described above.

Returning to FIG. 1, it is a requirement of most linear motor driven systems that moving element 14 is substantially coaxial with cylinder bore 16 so that the system can operate with moving element 14 in close clearance relation to cylinder bore 16 without lubrication. There are a number of factors that control the quality of coaxial alignment of moving element 14 and cylinder bore 16. Among them are the alignment of reciprocator 10 and cylinder assembly 12, and the concentricity of moving element 14 and pilot 28. Additionally, the perpendicularity of pilot face 30 and moving element 14 affects the co-axiality of moving element 14 and cylinder bore 16.

Typically, in order to assure co-axiality of components sufficient for close-clearance operation, very precise manufacturing of individual parts must be provided. By "manufacturing" is meant, for example, the "machining," "molding," "casting," "finishing," "cutting," or "tooling" of parts to desired dimensions. The high precision required when individual components are manufactured to fit into a close-clearance assembly is expensive and oftentimes unreliable.

Method

Figure 7:
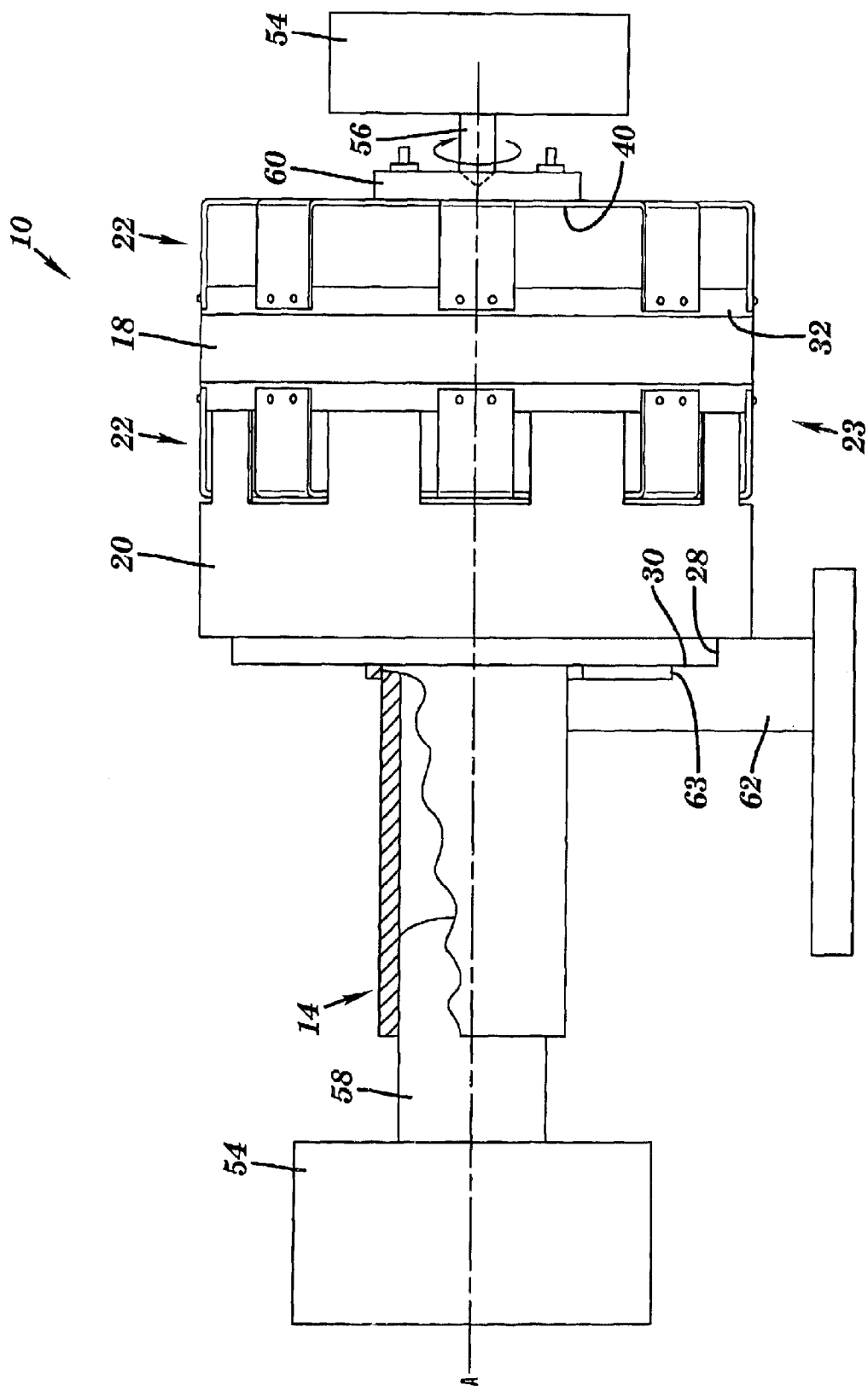
FIG. 7 shows a method in accordance with the invention.
Figure 8:
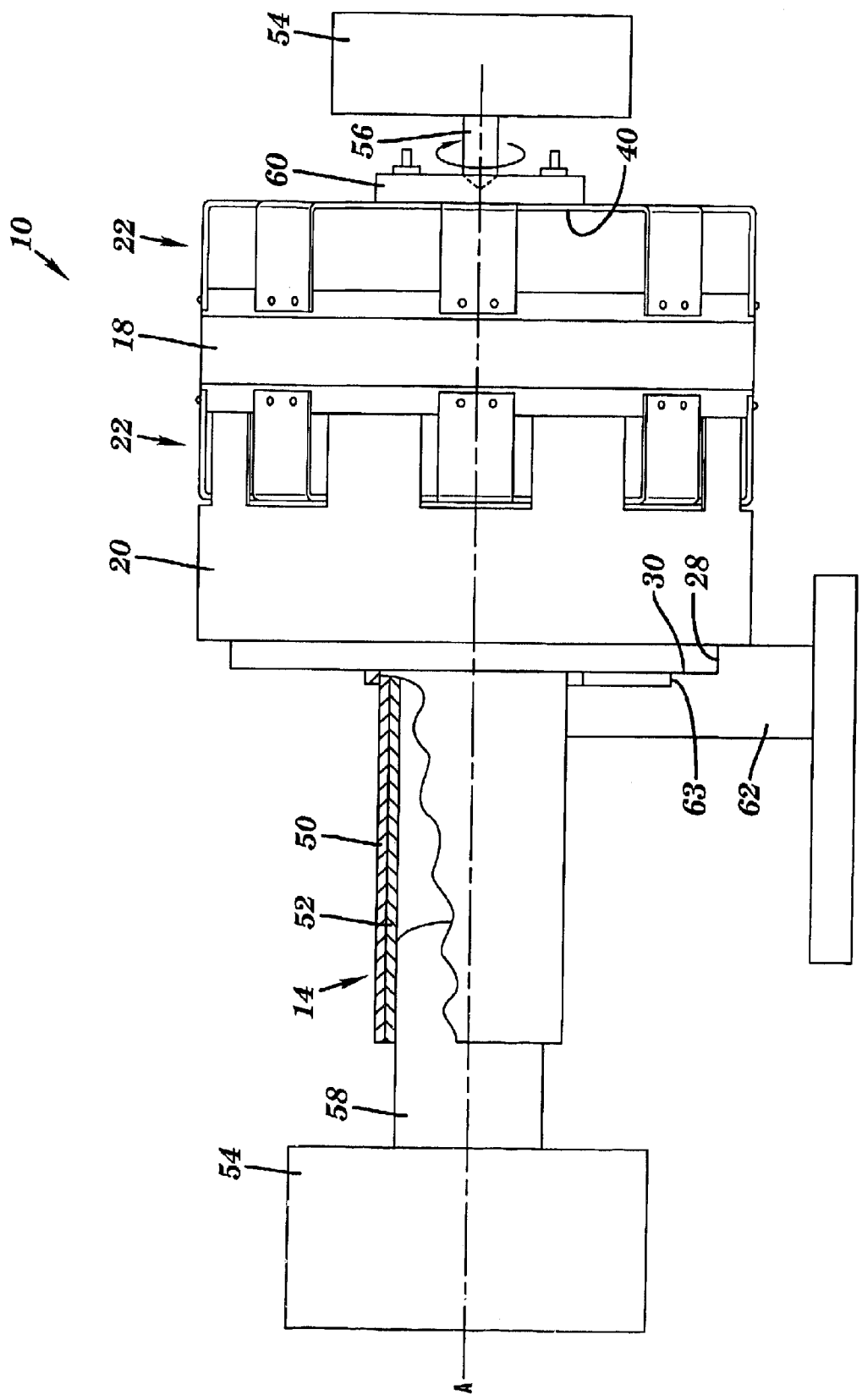
FIG. 8 shows an alternative step of the method of FIG. 7.

Referring to FIGS. 7–10, a method of constructing a reciprocator 10 and a moving element 14 of reciprocator 10 is shown. It should be understood at the outset of the description of the method that a separate reciprocator casing 20 may or may not be provided with reciprocator 10. When a reciprocator casing 20 is not provided, reciprocator 10 may include an integral machinable surface, as shown in FIG. 8. Accordingly, processes described as being conducted on reciprocator 10 should be interpreted as being applicable to a reciprocator as an integral entity or including some separable machinable surface, such as reciprocator casing 20.

A method in accordance with the invention includes connecting moving element 14 to reciprocator 10 via a suspension that allows reciprocation and substantially prevents non-axial motion of moving element 14 relative to reciprocator 10. While a particular suspension element 22 and suspension 23 have been disclosed, other suspensions that restrict non-axial motion of moving element 14 such as rotation and/or radial motion are also suitable.

Reciprocator 10 is mounted, in an assembled form shown in FIG. 7, into a lathe 54 or similar finishing machine. Lathe 54 would have an output shaft 56 or spool 58 preferably piloted to moving element 14 and hub mounting 60 of reciprocator 10, respectively. Activation of lathe 54 causes a simultaneous rotation of moving element 14 and reciprocator 10 substantially about reciprocation axis A.

As reciprocator 10 rotates, a tool 62 machines a diameter of moving element 14 and pilot 28. Additionally, if a pilot face 30 is not already present, tool 62 may include an additional cutting edge 63 to machine pilot face 30 simultaneously with the machining of moving element 14 and pilot 28. Otherwise, cutting edge 63 may be omitted.

Pilot face 30 is preferably perpendicular to moving element 14 and pilot 28. The substantial prevention of non-axial motion, e.g., rotational and radial movement, provided by suspension 23 allows transmission of cutting forces and torques between moving element 14 and reciprocator 10. Hence, both moving element 14 and reciprocator 10 can be machined to desired dimensions in one set up of machining tool 62. One machining set up thus may include cutting moving element 14 to a first outer diameter, cutting a pilot 28 to a second outer diameter, and cutting a pilot face 30 of reciprocator 10. As a result, the concentricity of pilot 28 and moving element 14, and perpendicularity of pilot face 30 and moving element 14 are assured.

A single machining operation would not be practical or possible with prior art spiral suspensions or any form of traditional linear bearings because of the inability to withstand high torsional forces, i.e., the spiral suspensions and bearings twist in operation and cannot withstand the higher torsional forces applied during machining.

As an alternative, as shown in FIG. 8, the method may include the step of attaching a layer of material 50 to an inner member 52 of moving element 14. Attachment is preferably provided by an epoxy such as EP3203, manufactured by Ciba. Layer of material 50 has a hardness less than reciprocator 10 or casing 20 and inner member 52, and is preferably a polytetrafluorethylene (PTFE) based material such as RULGN®, manufacture by Dixon. The addition of layer of material 50 further lowers the cutting forces and torques applied between moving element 14 and reciprocator 10 during manufacture. Layer of material 50 has a thickness such that machining of moving element 14 to a desired outer diameter can occur without completely removing layer of material 50. Hence, layer of material 50 creates the outer diameter of moving element 14 and aids unlubricated operation of reciprocator 10.

Reciprocator 10, reciprocator casing 20, cylinder assembly 12 and moving element 14/inner member 52 are preferably made from a non-ferrous metal capable of withstanding the repetitious stresses of reciprocator 10. For instance, aluminum or magnesium are suitable.

Figure 9:
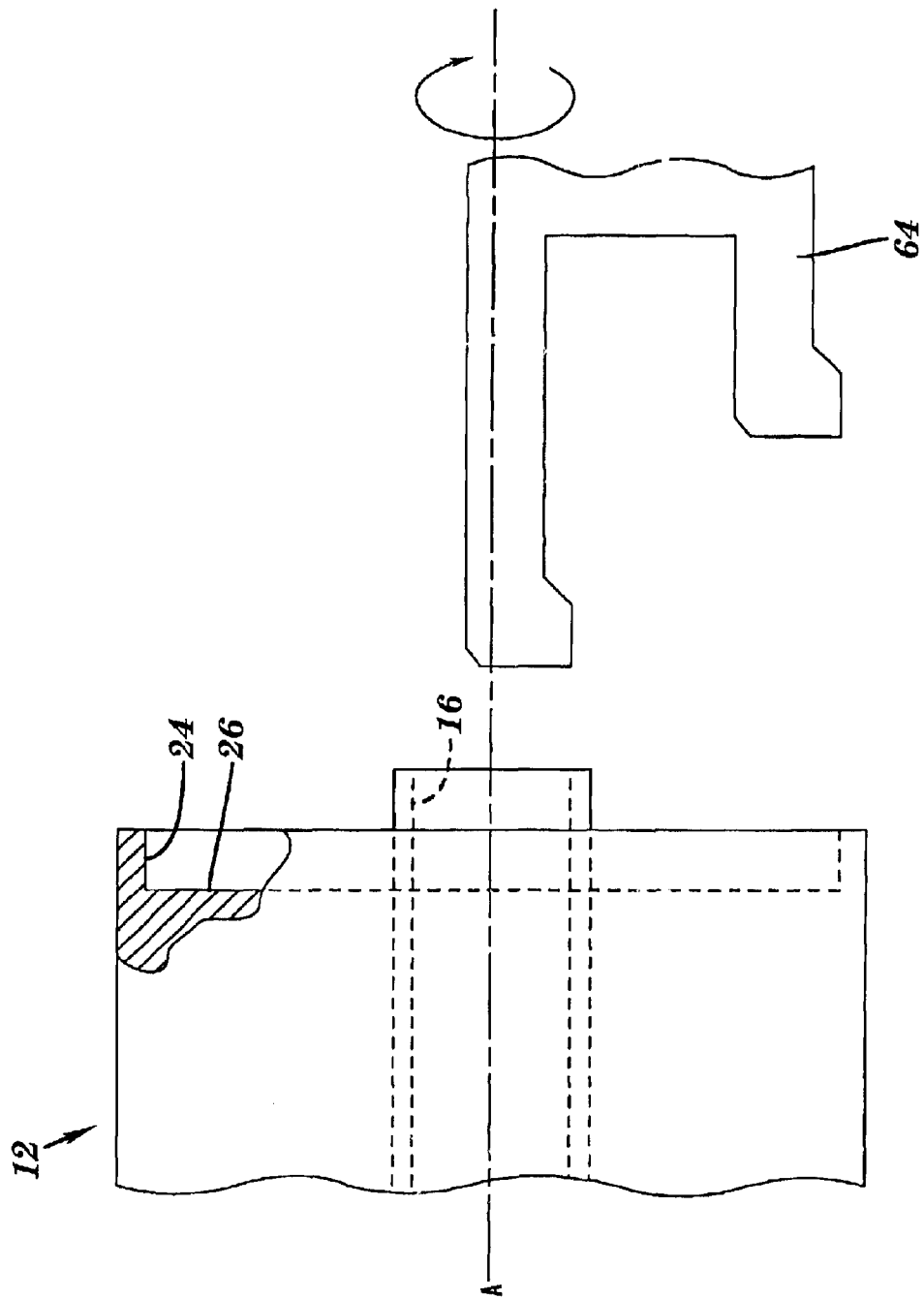
FIG. 9 shows an additional step for the method of FIG. 7.

Referring to FIG. 9, as a further step of the method, although not necessary, it is preferable that cylinder assembly 12 also be machined in a single step to assure concentricity of cylinder bore 16 and pilot bore 24, and perpendicularity of cylinder face 26 with cylinder bore 16 and pilot bore 24. Machining of cylinder assembly 12 is preferably performed by a dual boring bar 64 in a known fashion. With the additional step, the above-described method is capable of producing a close-fit, non-contacting alignment between a first element, e.g., moving element 14, coupled to a reciprocator for reciprocating movement along a reciprocation axis A, and a second element, e.g., cylinder bore 16, without requiring close-tolerance manufacturing of the component parts of the assembly.

Figure 10:
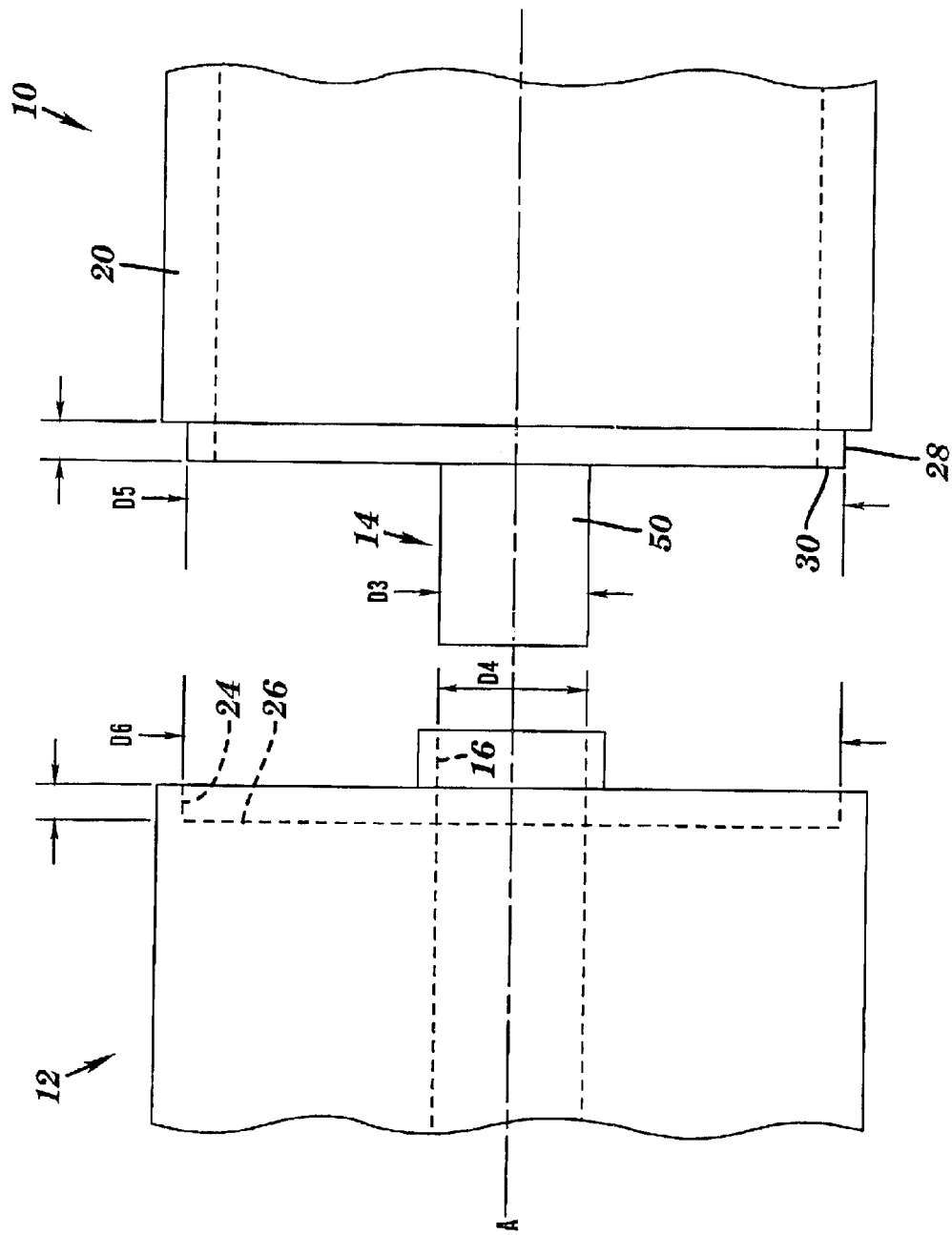
FIG. 10 shows a detail of the results of the method of FIG. 7.

As shown in FIG. 10, moving element 14 acquires an outer diameter D3 that, in an aligned manner, mates with an inner diameter D4 of cylinder bore 16. Similarly, pilot 28 has an outer diameter D5 that mates with very close or slight interference fit within inner diameter D6 of pilot bore 24.

Reciprocator 10 is clamped to cylinder assembly 12, which mates cylinder face 26 and pilot face 30. Since pilot 28 and moving element 14, and cylinder bore 16 and pilot bore 24, are concentric, and mating cylinder face 26 and pilot face 30 assure angular alignment of moving element 14 and cylinder bore 16, the uninhibited movement of moving element 14 in cylinder bore 16 can be assured.

Linear suspension 23/linear suspension element(s) 22 thus provide a mechanism not only for allowing suspended reciprocation of moving element 14 in reciprocator assembly 8 during operation, but also for reacting to non-axial forces, e.g., rotational/torsional and radial forces, exerted during manufacture. The result of the above-described methods is a free-running reciprocator assembly 8 without the expense of high precision machining of individual parts to a precision greater than that required for the final assembled close-clearance running fit. The above processes also make machining of reciprocator assembly 8 quicker and mass production possible.

Second Embodiment

Referring to FIGS. 11–15, another embodiment of the invention is illustrated. In any reciprocating device, there is a need to restrain the moving element to its intended axis of motion, while minimizing friction or drag associated with that restraint. Forces tending to move the reciprocating part (moving element or plunger) from its intended axis include magnetic side pull, drive force non-axiality, inertial reaction to housing motions, and non-uniform gas pressures or flows. In addition, many such devices must operate with little or no lubrication for applications where lubricant is undesirable. In such cases, ordinary sliding bearings are generally unsuitable because of wear, or lubricant to prevent wear. In such cases, flexible supports connecting the static parts (e.g., stator) and the moving element, have high stiffness in the radial sense and relatively low axial stiffness (at least over the intended reciprocation range).

As discussed above, there are two types of suspensions in use presently that differ in the means for addressing the strain in the suspension elements as the moving element moves from its rest position. In the more common spiral-planar spring suspension (see e.g., U.S. Pat. No. 4,238,845 to Haggard et al. and U.S. Pat. No. 5,522,214 to Becket et al.), the suspension consists of one or more aligned, and stacked plates attached to the stator at points about their periphery and to the moving element at their hubs. Between these connections, the plates are slotted, with typically two or three spiral cuts to create flexure element legs. These cuts relieve the stretching that the plates would otherwise endure when the hub is moved out-of-plane by moving element reciprocation. The spiral arms are subject instead to a twisting stress with respect to reciprocation distance, though at a lower level than the stress in an uncut plate with the center similarly displaced. Unless these are paired in left- and right-hand pairs (see FIG. 1 in U.S. Pat. No. 5,522,214 to Becket et al.), the twisting imparts an oscillatory rotation to the moving element. If oscillation is minimized by opposing pairs, the stress in the spiral arms rises, reducing the attainable strokes with respect to suspension diameter.

Figure 2:
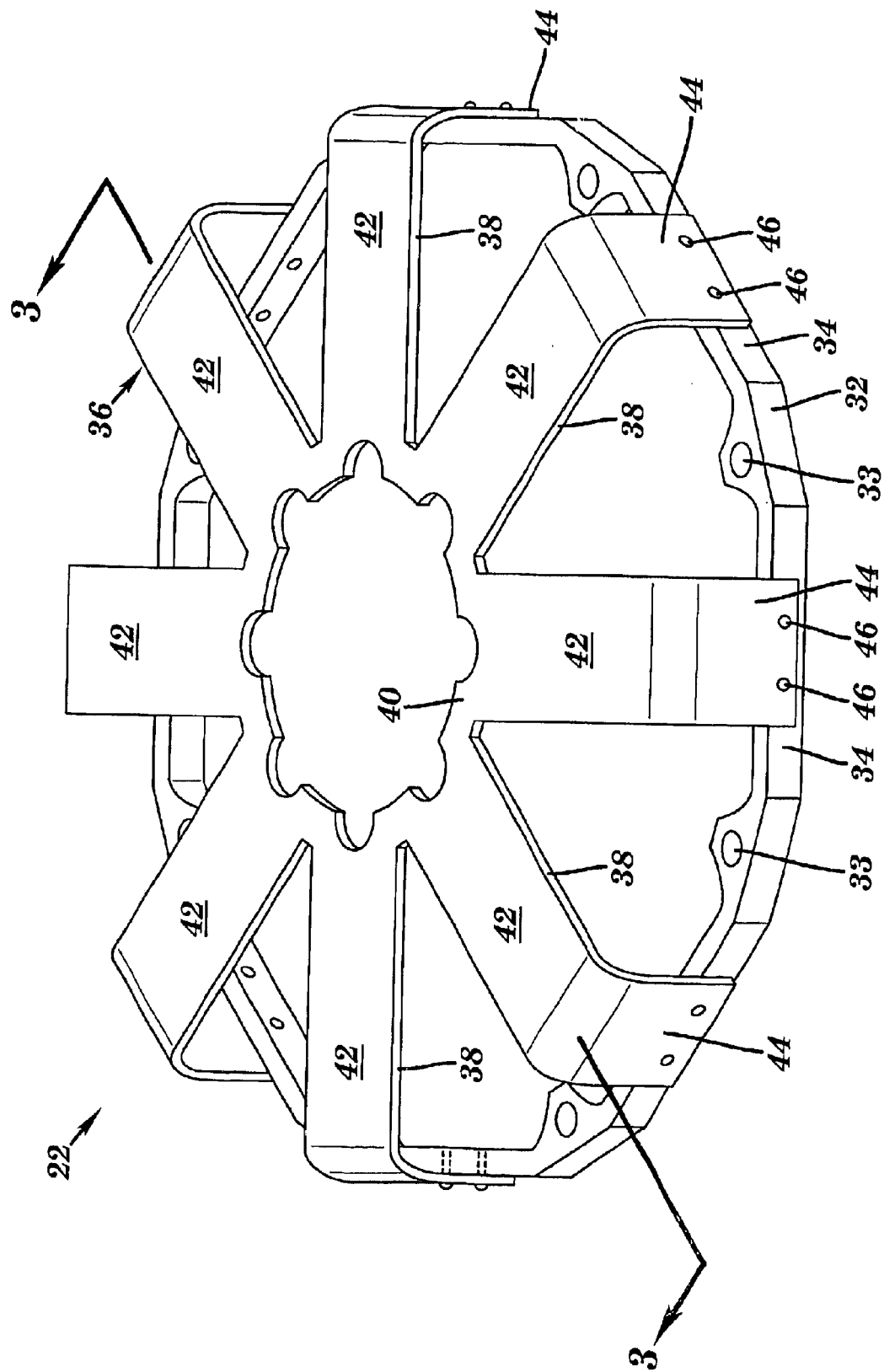
FIG. 2 shows a linear suspension element in accordance with the invention.

Another type of suspension, shown in FIG. 2 of the present invention and discussed above, incorporates a secondary stiffness (with or without a preload) attached to the stator ends of flexure element legs 38, where the secondary stiffness allows for radial motion of the stator ends of the flexure element legs 38 to relieve the stretching that would otherwise be forced on the flexure element by the reciprocation motion perpendicular to the elements. This system allows only a pure reciprocation, without rotation about the reciprocation axis. A further benefit of this type suspension can be realized in the case of electrodynamic devices like that taught in U.S. Pat. No. 5,389,844 to Yarr et al., where the clearance interface between stator and moving element is not circular in section (perpendicular to reciprocation). This configuration allows smaller machines and simpler construction. This construction requires close angular positioning of the stator and moving element to prevent contact during reciprocation.

In either type of suspension, but especially in the non-rotating type, it is essential to maintain the moving element suspended such that the attachments of the suspension to the linear drive mechanism (e.g., stator part) and moving element are accurate and tight (i.e., without free movement or slippage at the connections). If the mounting attachments are not tight and accurate, then even an ideal suspension cannot guarantee the moving element will remain suspended.

Presently, suspensions, whether spiral-planar or secondary-stiffness radial, are attached to the moving element and linear drive mechanism (LDM)(most likely the stator) by precisely sized fasteners or locating pins through precisely sized and located holes (e.g., mounting holes) in the suspension mount, LDM, moving element or related mounting structure. At least one such precision alignment assembly is required to ensure concentricity, and another for ensuring angular position. Although functional, such alignment assemblies require multiple high-precision features to be manufactured, and create a lengthy chain of tolerances between the moving element and LDM that are to be aligned. For example, a tolerance chain might include, inter alia: 1) moving element hole position relative to the in moving element interface surface; 2) moving element hole size relative to fastener, 3) fastener/pin size relative to holes; 4) suspension element hole size relative to fastener; 5) suspension element hole position relative to other holes (e.g., stator hole); 6) suspension LDM hole size relative to fastener/pin; 6) fastener/pin size relative to holes; 7) LDM hole size relative to pin; and 8) LDM hole position relative to LDM interface surface. Typical nominal running clearances are 0.5 to 1 millimeter, so in this example of a tolerance chain with 8 steps, each individual tolerance must be controlled to within approximately ⅛ that total clearance (on average) to assure no contact during reciprocation from the sum of errors.

Figure 11:
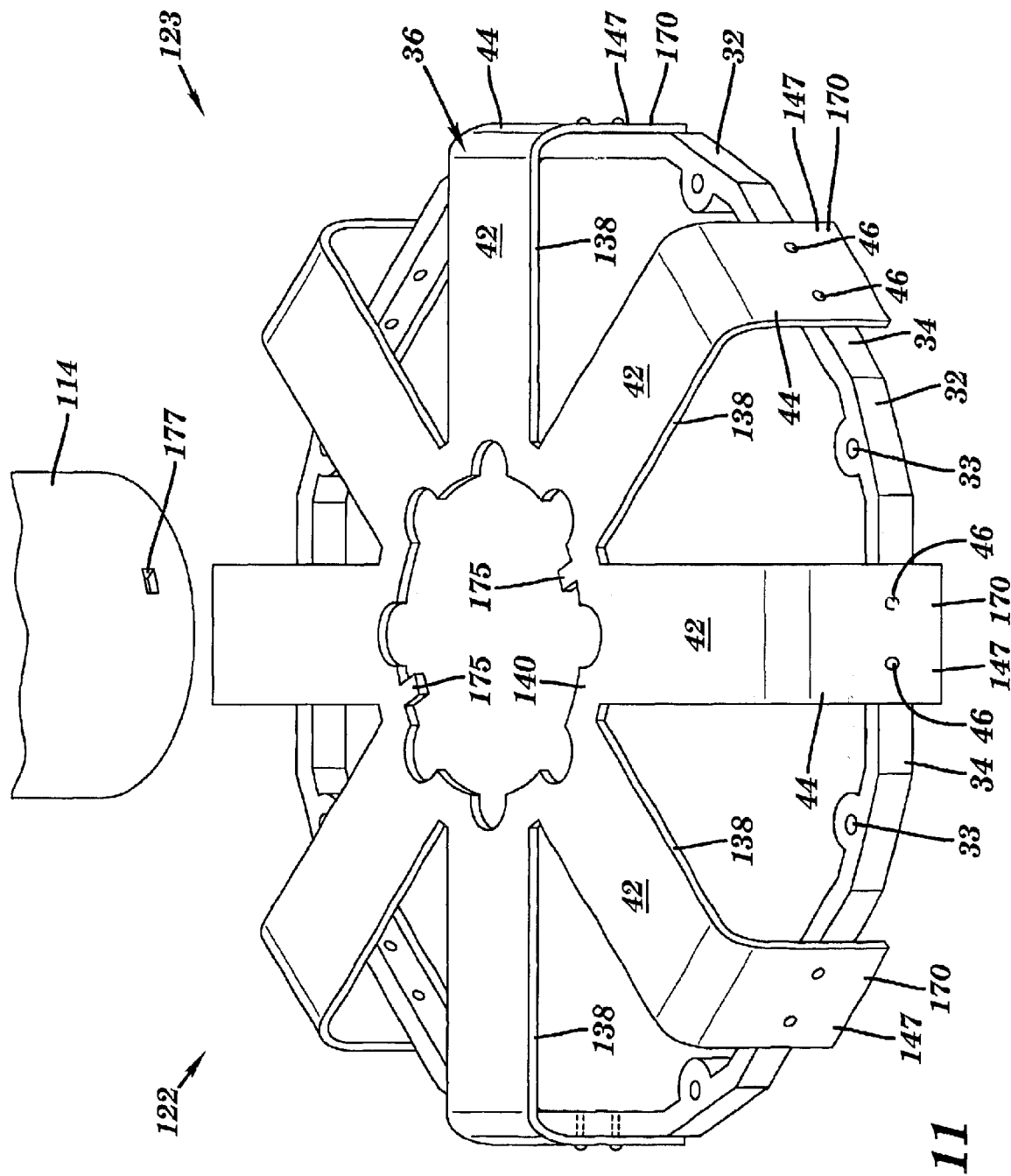
FIG. 11 shows a linear suspension in accordance with a second embodiment of the invention.
Figure 12:
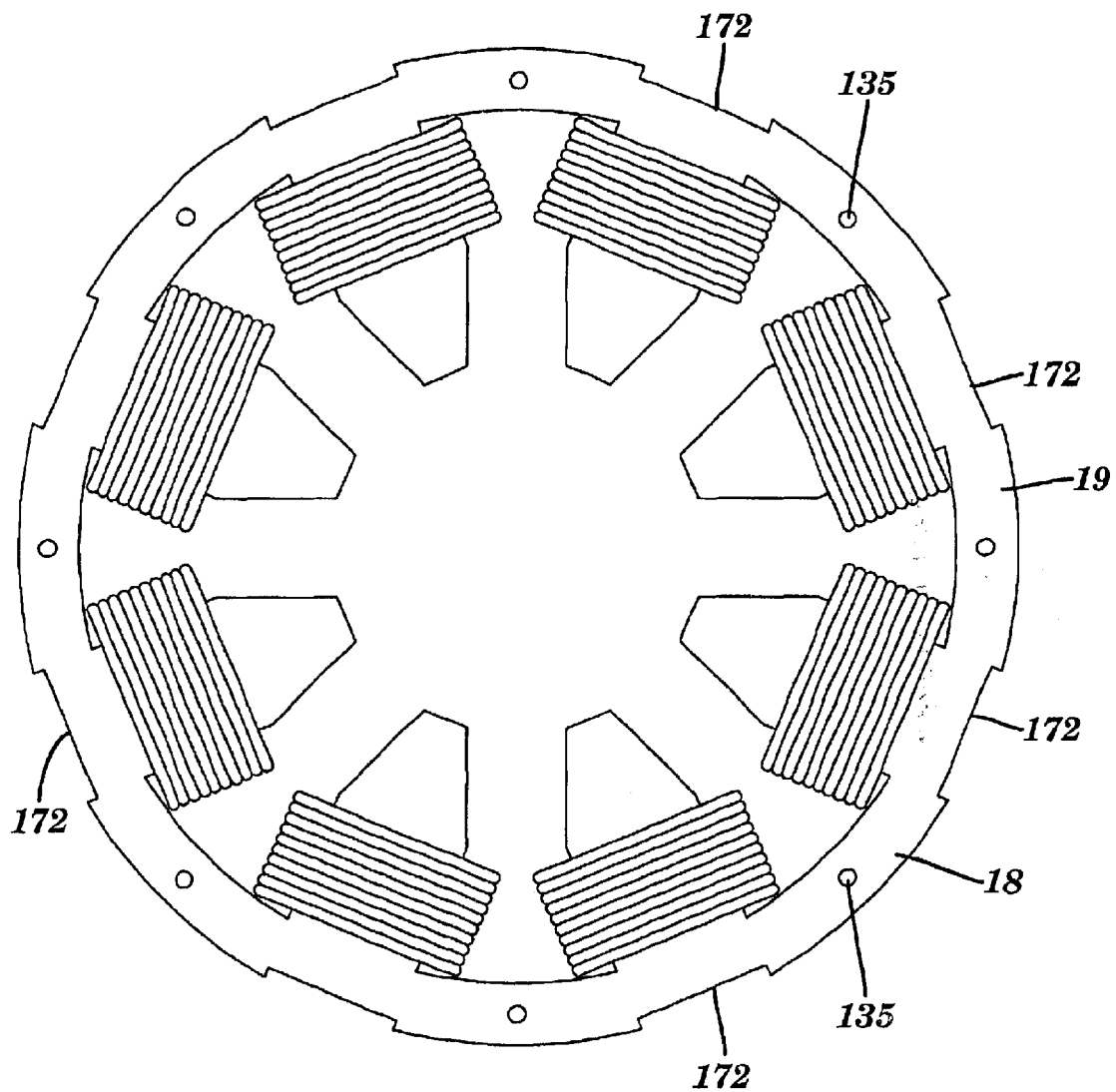
FIG. 12 shows a drive mechanism for use with the linear suspension of FIG. 11.
Figure 13:
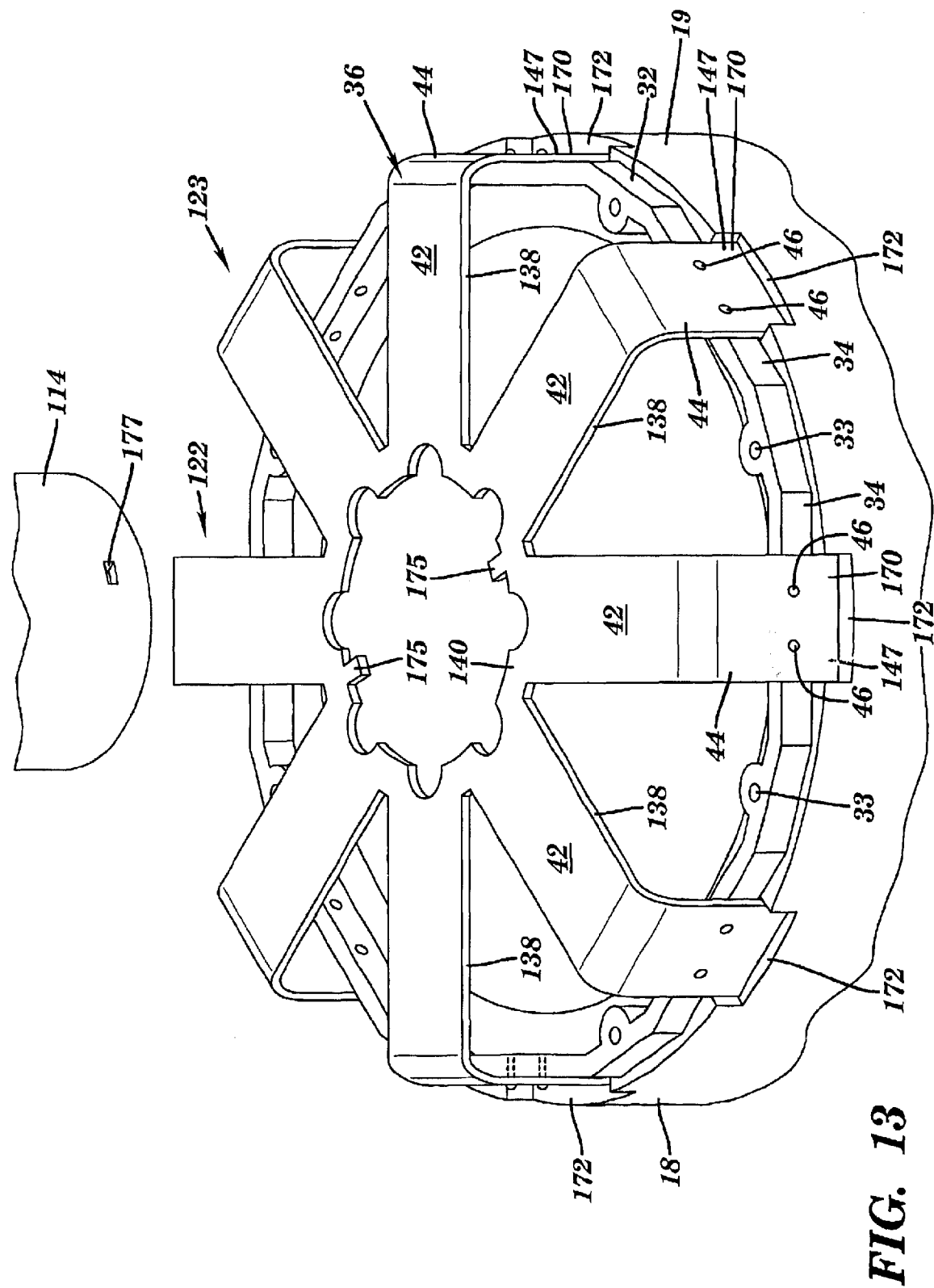
FIG. 13 shows a reciprocator incorporating the linear suspension of FIG. 11 and drive mechanism of FIG. 12.

Referring to FIGS. 11–13, in accordance with the second embodiment of the present invention, a reciprocating device having a moving element 114, a linear drive mechanism 18, with stator 19, and a flexing suspension 123 for coupling the moving element 114 and stator 19 and for maintaining the moving element on axis is provided. The flexing suspension 123 includes at least one flexing element 122 locating the LDM 18/stator 19 relative to the moving element 114 by directly engaging features of the flexing element to mating features of the LDM/stator.

In FIGS. 11 and 13, the second embodiment is applied to an exemplary secondary-stiffness radial suspension. The suspension flexure element 122 engages the moving element 114 at a first portion and the mount 32 at a second portion. Furthermore, the flexure elements 138 locate the stator 19 relative to the moving element 114 by directly engaging features 147 of the flexing element 122 (third portions) to mating features 172 of the stator 19. In this example, engaging features 147 of the flexing element are extensions 170 of flexing element legs 138. Since the width of flexure element legs 138 are already an easily-made and closely-controlled feature, using that as the engaging feature 147 adds no new manufacturing costs. Of course, structures other than an integral extension 170 may be possible such as add-on extensions. As shown in FIGS. 12 and 13, LDM 18/stator 19 is provided with corresponding mating features 172, e.g., recesses, to closely receive extensions 170. The mating features 172 may extend the entire axial length of the LDM/stator (FIG. 12) or just a portion of the axial length (FIG. 13).

Although only two such engagements of features 147, 172 are required to control both concentricity and angular relationships between LDM 18 and moving element 114, additional features may be added without penalty. In particular, where multiple flexure elements legs 138 (4 or 8 are typical) are used to bear the magnetic forces, each flexure element leg may make such an engagement without added cost, and indeed saving some cost by making all elements the same. It should be recognized that flexure elements 122 may also incorporate the preload as described above relative to the first embodiment. The suspension elements and stator components (if laminates) are preferably produced either by electric-discharge wire machining or, if thin, by stamping. For suspension elements of constant width (single-leg pieces), elements may also be manufactured and finished by slitting directly to width from continuous coils, then cutting to length. The stator 19 can be stacked laminates and may be bolted or glued to one another to hold them together.

It should be recognized that while FIGS. 11–13 illustrate the teachings of the present embodiment to avoid the use of pinned or fastener alignment assemblies, those assemblies may also be provided. In particular, such structure may be provided to hold the device together. Hence, FIGS. 11–13 also show mounting holes 33 in suspension mount 32 and mating holes 135 (FIG. 12) in linear drive mechanism 18.

Figure 14:
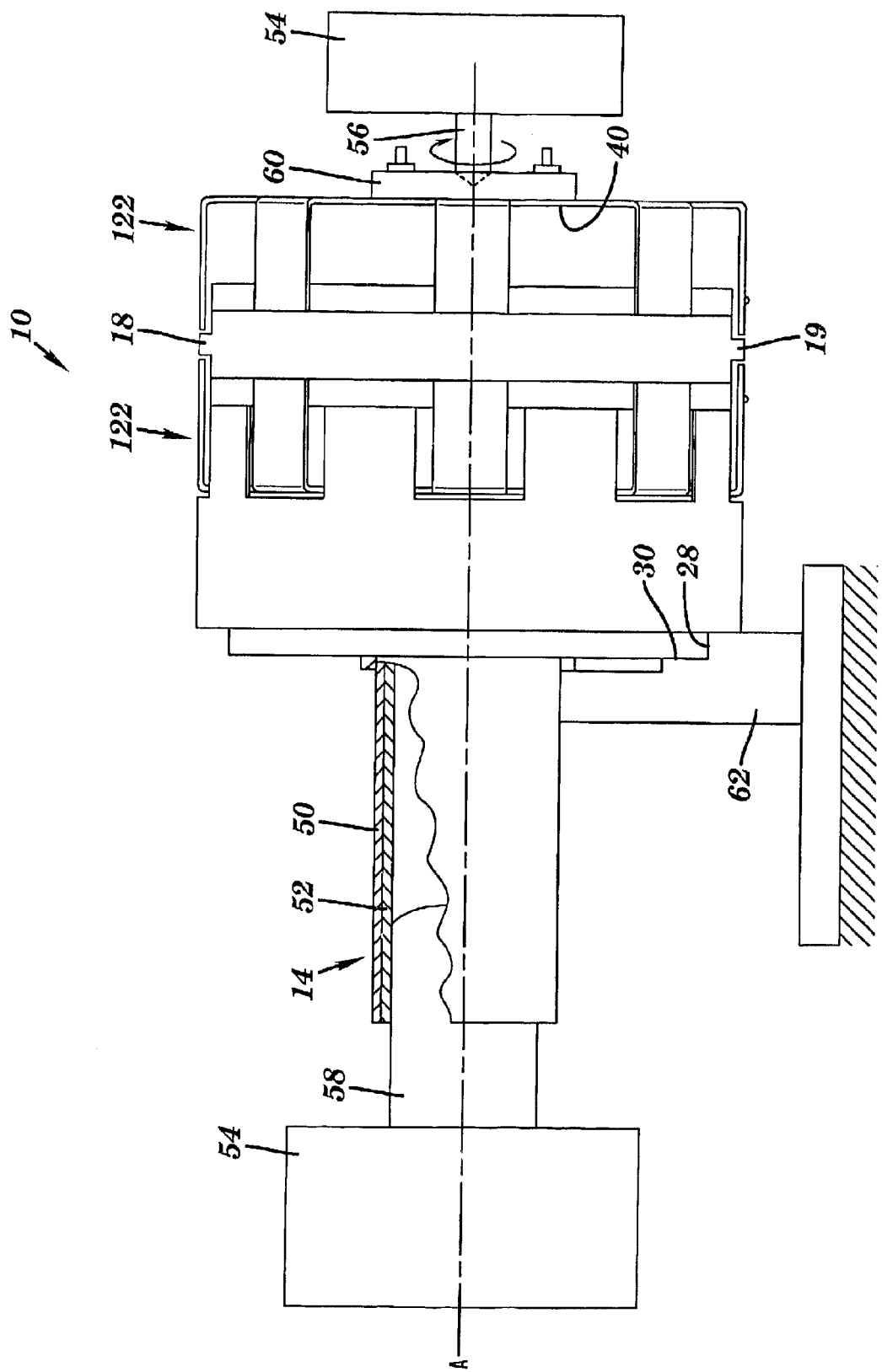
FIG. 14 shows a reciprocator including two linear suspensions like that of FIG. 11.

FIG. 14 illustrates a reciprocator 10 having two suspensions 122 incorporating the flexure element leg engagement with linear drive mechanism 18 (e.g., stator 19).

Figure 15:
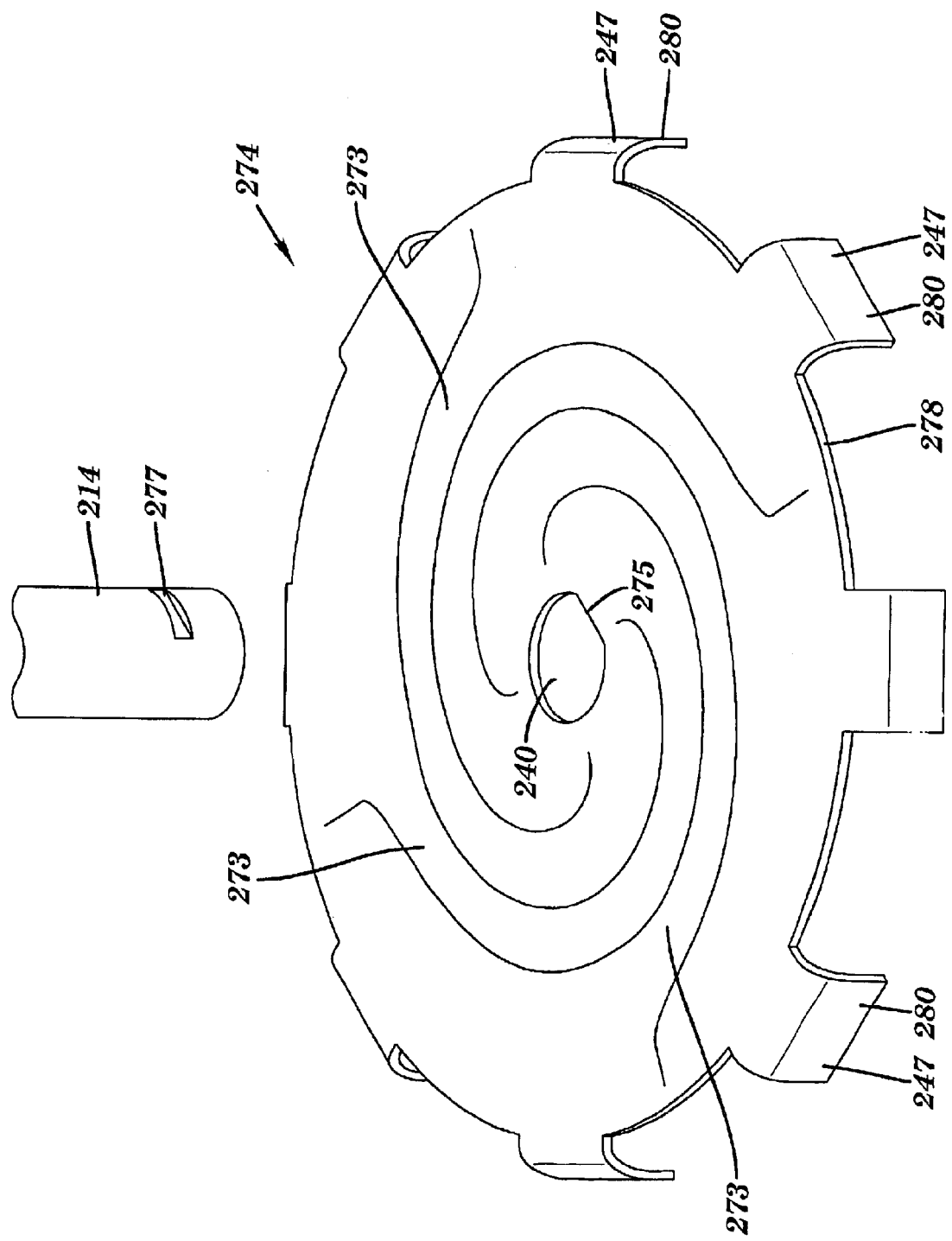
FIG. 15 shows a spiral suspension adapted according to the second embodiment.

As shown in FIG. 15, the above teachings may also be applied to other suspensions. In FIG. 15, a suspension comprising a spiral-planar suspension element 274 is shown. (Conventionally, a stack of elements are used in this type suspension). Spiral-planar element 274 includes spiral legs 273 (created by slots, typically two or three spiral cuts) that extend between a hub 240 for moving element 214 and a peripheral LDM coupling section 278. Peripheral coupling section 278 may be bolted to the linear drive mechanism 18/stator 19 in the conventional manner. Engaging features 247 for engaging the LDM 18/ stator 19 are in the form of keys 280 (tangs) provided on the periphery of an element 274. The engaging features 247 may also be tabs cut at the periphery of elements 274, then bent out-of-plane, or may be partially separated plug-punchings, or internally ¾ punched and bent tabs, or other forms readily appreciated by those in the metalworking art. The LDM 18/stator 19 for this suspension may be in a form similar to that shown in FIG. 12 or FIG. 13.

Referring to FIGS. 11, 13 and 15, as an alternative to hub mounting 60 described in the first embodiment, hub 140, 240 may be coupled to moving element 114, 214 directly. In this case, a male-female locating feature 177, 277 may be provided on moving element 114, 214, respectively. Although only one locating feature 177, 277 is shown, more than one locating feature may be provided, e.g., on opposing sides of the moving element. Locating feature 177, 277 may be a recess, as shown in FIGS. 11 and 13, a flat cut into die circular moving element, as shown in FIG. 15, or any other structure that will assure locating engagement of the moving element and suspension element. A hub 140, 240 of the suspension includes a complimentary male-female structure, e.g., a key 175 for mating with recess 177 as shown in FIGS. 11 and 13, or a flat 275 for mating with the flat in moving element 214 as shown in FIG. 15. Where more than one locating feature 177, 277 is provided, more than one mating feature 175, 275 may also be provided. It should be recognized that while particular examples of mating structures have been disclosed, others may be possible. For example, where moving element 114, 214 is circular, any non-circular mating structures may be employed.

The second embodiment of the present invention addresses the need to provide for accurate centric and angular alignment between moving element 114, 214 and linear drive mechanism 18/stator 19 in a reciprocating device, especially where the interface is non-circular in section. It achieves this function without the cost and complexity of multiple discrete alignment features. For instance, it eliminates aspects of the tolerance chain by only requiring that the stator be aligned to the moving element. As a result, the present invention provides less costly precision location in suspended reciprocators; elimination of parts and failure modes in service due to part separations; enablement of many new markets and applications not previously addressable with resonator-type thermoacoustic and Stirling devices, where high efficiency at low cost is required for commercial application; and faster and more robust assembly procedures without extra parts and separate, close-fit keying elements.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A reciprocating device having a moving element, a stator and a flexing suspension for coupling the moving element and stator and for maintaining the moving element on axis, flexing suspension comprising:
   at least one flexing element including a first portion and a second portion angled relative to the first portion, each flexing element locating the stator relative to the moving element by directly and non-fixedly engaging a feature of at least one second portion to a respective mating feature of the stator.

2. The reciprocating device of claim 1, wherein a preload is provided in each flexing element by the second portion of each being angled relative to the first portion at an angle that is less than an angle of forming.

3. The reciprocating device of claim 2, wherein the angle with the first portion is less than 90°.

4. The reciprocating device of claim 2, wherein a preload is provided in each flexing element by an inner distance between any two opposing second portions being less than an outer distance between any two opposing sides of the stator to which the second portions are coupled.

5. A linear suspension element for a reciprocating device having a moving element and a linear drive mechanism, the suspension element comprising:
   a mount; and
   a plurality of legs each having a first portion for coupling to the moving element, a second portion coupled to the mount and a third portion engaging the linear drive mechanism.

6. The linear suspension element of claim 5, wherein a preload is provided in the suspension element by each second portion being set at an angle with the first portion less than an angle of forming.

7. The linear suspension element of claim 6, wherein the angle with the first portion is less than 90°.

8. The linear suspension element of claim 5, wherein a preload is provided in the suspension element by an inner distance between any two opposing second portions being less than an outer distance between any two opposing sides of the mount to which the second portions are coupled.

9. The linear suspension element of claim 8, wherein the inner distance is about 1% less than the outer distance.

10. The linear suspension element of claim 8, wherein the preload is provided by each second portion being set at an angle with the first portion less than an angle of forming.

11. The linear suspension element of claim 10, wherein the angle with the first portion is less than 90°.

12. The linear suspension element of claim 8, wherein the mount includes a side for coupling to each second portion.

13. The linear suspension element of claim 8, wherein each second portion is preloaded against a fulcrum edge of each side.

14. The linear suspension element of claim 5, wherein each first portion extends substantially radially to the moving element and each second portion extends substantially axially relative to a reciprocation axis of the moving element.

15. The linear suspension element of claim 5, wherein the mount includes a side for coupling to each second portion.

16. The linear suspension element of claim 5, wherein teach leg is keyed to the linear drive mechanism.

17. A reciprocating device comprising:
   a linear drive mechanism for linearly moving a moving element;
   at least one suspension element operatively coupled to the linear drive mechanism, each suspension element having:
      a mount;
      a plurality of legs each having a first portion for coupling to the moving element, a a second portion coupled to the mount, a third portion engaging the linear drive mechanism; and
      wherein each leg includes a preload.

18. The reciprocating device of claim 17, further comprising a reciprocator casing coupled to the linear drive mechanism.

19. The reciprocating device of claim 17, wherein a preload is provided in the suspension element by each second portion being set at an angle with the first portion less than an angle of forming.

20. The reciprocating device of claim 17, wherein a preload is provided in the suspension element by an inner distance between any two opposing second portions being less than an outer distance between any two opposing sides of the mount to which the second portions are coupled.

21. The reciprocating device of claim 20, wherein the preload is provided by each second portion being set at an angle with the first portion less than an angle of forming.

22. The reciprocating device of claim 20, wherein the mount includes a side for coupling to each second portion.

23. The reciprocating device of claim 22, wherein each second portion is preloaded against a fulcrum edge of each side.

24. The reciprocating device of claim 17, including two linear suspension elements.

25. The reciprocating device of claim 17, wherein the third portion is coupled to the linear drive mechanism by a key and recess arrangement.

26. A linear suspension for a moving element of a reciprocating device having a lines drive mechanism for the moving element, the suspension comprising:
   a first mount coupled to a stator of the linear drive mechanism;
   a plurality of legs each having a first portion coupled to the moving element a second portion coupled to the first mount, and a third portion coupled to the stator;
   a second mount coupled to the linear drive mechanism; and
   a plurality of legs each having a first portion coupled to the moving element, and a second portion coupled to the second mount, and a third portion coupled to the stator.

27. A reciprocating drive comprising:
   a moving element including a plurality of male-female locating features positioned at distance points on a periphery of the moving element;
   a linear drive mechanism for linearly moving the moving element;
   a suspension element having:
      a hub including a plurality of complimentary male-female features for mating with the male-female locating features of the moving element;
      a plurality of legs; and
      at least one engaging feature for engaging the linear drive mechanism.

28. The reciprocating device of claim 27, wherein the legs extend radially from the hub and each engaging feature is an extension of a leg.

29. The reciprocating device of claim 27, wherein the legs extend in a spiral-planar fashion from the hub, and each engaging feature is a member that extends out of plane with the rest of the suspension element.

30. The reciprocating device of claim 29, further comprising a plurality of suspension elements, only one of which includes the mating and engaging feature.

* * * * *

UNITED STATES PATENT AND TRADEMARK OFFICE
CERTIFICATE OF CORRECTION

PATENT NO. : 6,841,900 B2
DATED : January 11, 2005
INVENTOR(S) : John A. Corey

It is certified that error appears in the above-identified patent and that said Letters Patent is hereby corrected as shown below:

Column 13,
Line 23, please insert -- relative -- after the word "radially".

Column 14,
Line 16, delete "lines" and insert -- linear --.
Line 32, delete "distance" and insert -- distinct --.

Signed and Sealed this

Nineteenth Day of April, 2005

JON W. DUDAS
*Director of the United States Patent and Trademark Office*